G. H. DAY.
OPHTHALMIC MOUNTING.
APPLICATION FILED JAN. 29, 1917.
1,305,697.
Patented June 3, 1919.
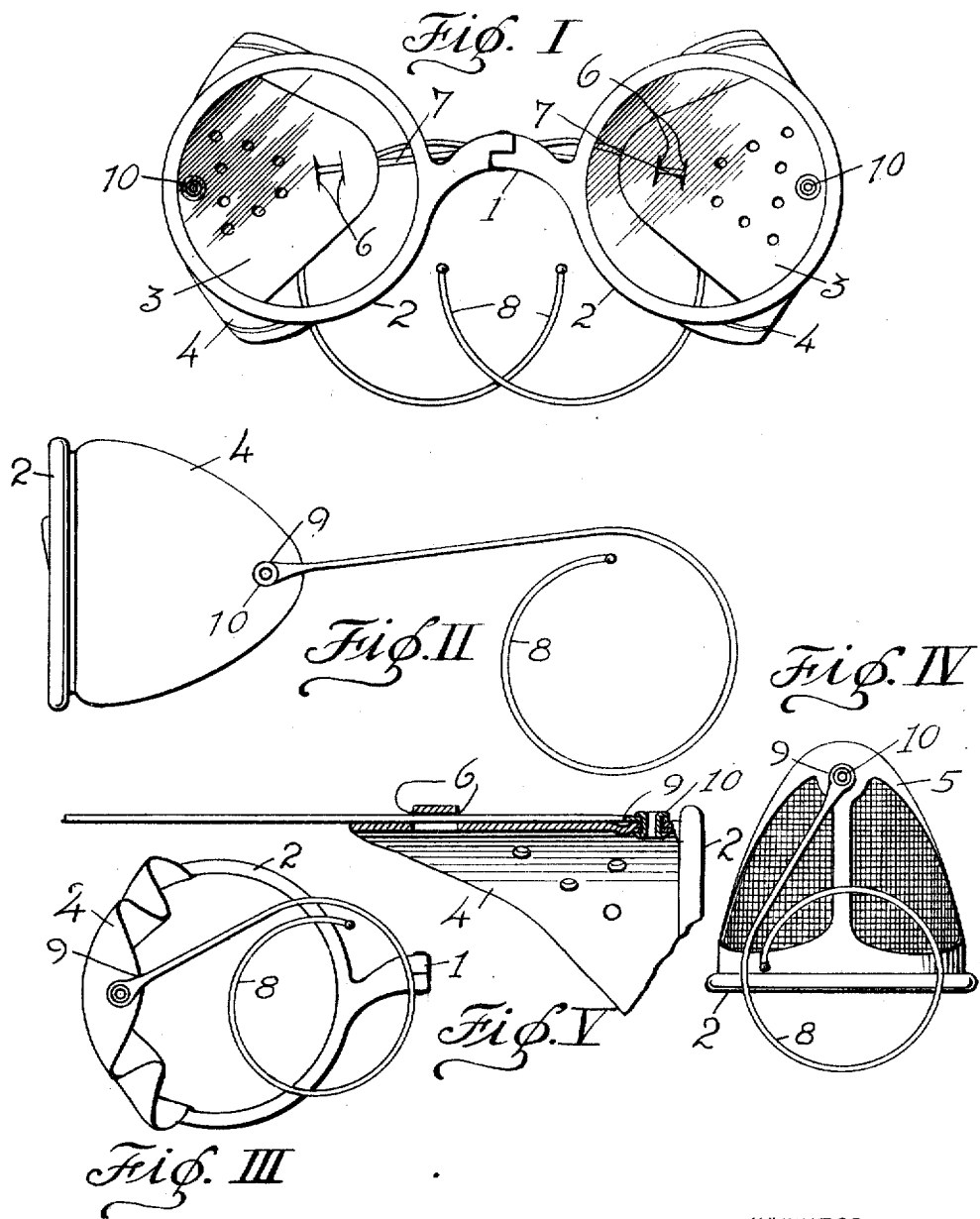
INVENTOR
GEORGE H. DAY
BY
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,305,697. Specification of Letters Patent. Patented June 3, 1919.

Application filed January 29, 1917. Serial No. 145,166.

*To all whom it may concern:*

Be it known that I, GEORGE H. DAY, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings and particularly to a division of my original application filed on March 22, 1915, Serial No. 16,062, patented November 9, 1915, Patent Number 1,159,751, and has particular reference to an improved manner of attachment of the head or ear-engaging members for retaining the mounting in position on the face.

One of the leading objects of the present invention is the provision of a simple, inexpensive construction in which a temple may be satisfactorily united to an ophthalmic mounting or the like to permit of desired tilting of the temple.

A further object of the present invention is the provision of an improved construction through the use of which the parts may be swung into extremely compact form when not in use, and in which the parts will be substantially rigidly disposed to satisfactorily retain the mounting when on the face.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a view of a mounting embodying my improvement in partially folded position.

Fig. II represents an end view of a modified construction with the parts in position for use.

Fig. III represents a view of the construction illustrated in Fig. II with the parts in folded relation.

Fig. IV represents my improvement applied to a metallic screen member.

Fig. V represents a sectional view of my construction.

In the drawings, the numeral 1 designates the bridging portion of an ophthalmic mounting, which in the present instance has been illustrated as formed from non-metallic material, and is provided with the frames 2 adapted to receive the lenses 3. These frames have suitably secured or connected thereto either the flexible shield members 4 or the metallic shield members 5, as illustrated in different figures of my drawings.

Referring particularly to the construction illustrated in Fig. I, I have shown the flexible side or shield member 4 as provided with a pair of slots 6 and as having threaded through these slots the temple member 7 having at one end the ear hook 8 and at the opposite end an enlarged portion 9 providing an eye to receive the rivet or attaching device 10, which passes through the eye of the temple and serves to pivotally secure the temple to the shield.

By reference to Fig. I it will be noted that when the parts are in folded relation the temple may be swung up or down as desired to bring it more nearly into alinement with the lens frames and facilitate packing the mounting into compact space, as in a case or in the pocket, the combined pivotal connection of the temple to the shield and the flexibility of the shield uniting to facilitate desired adjustment of the temple. On the other hand when the mounting is applied to the face of the wearer the steadying of the temple by engagement with the ends of the slots 6 and the relative rigidity of the flexible shield member on account of its cup like formation in open position will prevent undue tilting of the mounting while allowing of a slight adjustment thereof about the temples 10 to secure the best fit of the mounting on the face of the wearer.

In Figs. II and III, I have illustrated a slight modification of my construction in which the temple in place of being attached to the shield adjacent the lens frames is attached to the tip of the shield. The advantage here present will be best understood by reference to Fig. III, from which it will be seen that in the case of a folded mounting, such as here illustrated, the temple may by suitable crumpling or folding of the shield member, combined with swinging of the temple on its pivot, be so disposed that its length will only be equal to that of the folded mounting, thus permitting the device to be placed in a small case, watch pocket or the like, at the same time obviating the objections and difficulties experienced with temples provided with intermediate hinges or the like to facilitate their folding.

Fig. IV illustrates my improvement as applied to a metallic shield, where it posseses the advantage of slight tilting and of swinging about to overlie the shield when the parts are in folded relation and thus occupy a minimum amount of space, a result not hitherto accomplishable in the art without the use of a temple provided with a hinge or the like intermediate its length, making an unsatisfactory and unworkmanlike job, and at the same time presenting a plurality of parts liable to get out of order and to catch in the hair of the wearer and consequently render the device unpopular.

By the use of my device, however, there are no objectionable projecting parts present, the temple may be readily formed with a single eye; no expensive hinge joints or the like anywhere on the mounting are required; the temples are adjustable within limits to facilitate fitting of the mounting on the face, and are particularly adjustable upon folding of the mounting to occupy a minimum of space and allow of the mounting equipped with my improvement being readily packed away without distortion of the temples as is now necessary when it is desired to place the mounting in small compass.

I claim:

1. In a device of the character described, the combination with a lens frame and a flexible shield member having a pair of slots therein, of a temple pivoted to the shield member and extending through the slots in the shield, said temple being adjustable with the shield member upon flexing thereof and relative to the shield member swinging upon its pivot the length of the slots.

2. In a device of the character described, the combination with a lens frame and a flexible shield member carried thereby, of a temple pivoted to the shield member and adjustable with the shield member upon flexing thereof and relative to the shield member by swinging on its pivot.

3. The combination with a flexible shield member, of a temple pivotally secured thereto.

In testimony whereof I affix my signature in the presence of two witnesses.

GEORGE H. DAY.

Witnesses:
J. JOSEPH MACCARTHY,
H. K. PARSONS.

Copies of this patent may be obtained for five cents each, by addressing the "Commissioner of Patents, Washington, D. C."